Patented Oct. 22, 1929

1,732,486

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

PROCESS FOR THE VULCANIZATION OF RUBBER

No Drawing.   Application filed August 6, 1928.   Serial No. 297,919.

The present invention relates to the vulcanization of rubber by an improved process wherein the products obtained by reacting mercapto-aryl-thiazoles, their alkaline salts and the like, with 2,4 dinitrochlorbenzene are employed as vulcanization accelerators. It is well known among rubber chemists that the mercapto-aryl-thiazoles constitute a valuable group of vulcanization accelerators. It has now been found that on reacting mercapto-aryl-thiazoles, such for example as the potassium salt of mercapto-benzo-thiazole and the like, with dinitrochlorbenzol there is formed an important class of compounds which may be used alone as a vulcanization accelerator or preferably in conjunction with an organic amine accelerating compound to form a mixed accelerator. It has furthermore been found that when used either alone or as part of a mixed accelerator, of which the other component is an organic amine accelerating compound, very little vulcanization takes place at the lower temperatures. Such delayed action on the part of vulcanization accelerators is of particular importance, as it prevents partial curing of the rubber taking place during the milling operations or at other times prior to the actual vulcanization process.

The invention will be fully understood from the following description and examples.

Rubber stocks were compounded in the usual manner comprising 100 parts of pale crepe rubber, 5 parts of zinc oxide, 6 parts of sulfur and 0.5 parts and also 1.0 part respectively of the reaction product of 2,4 dinitrochlorbenzene and the potassium salt of mercapto-benzo-thiazole. On testing strips of the above described stock vulcanized by heating in a press for different periods of time under temperatures given by different steam pressures, the following tensile data were obtained.

| Cure min. | Pressure lbs. steam | Parts of accelerator | Modulus of elasticity in lbs./in.² at elongations of— | | | Tensile at break | Elongation at break (%) |
|---|---|---|---|---|---|---|---|
| | | | 300% | 500% | 700% | | |
| 30 | 40 | 0.5 | 112 | 262 | 768 | 1715 | 850 |
| 30 | 40 | 1.0 | 140 | 365 | 1200 | 2715 | 850 |
| 45 | 40 | 0.5 | 162 | 369 | 1100 | 2310 | 830 |
| 45 | 40 | 1.0 | 215 | 505 | 1585 | 2940 | 810 |
| 60 | 40 | 0.5 | 182 | 413 | 1335 | 2380 | 808 |
| 60 | 40 | 1.0 | 253 | 592 | 1795 | 2955 | 785 |
| 90 | 40 | 0.5 | 219 | 453 | 1275 | 2590 | 820 |
| 90 | 40 | 1.0 | 271 | 649 | 1820 | 3100 | 795 |
| 120 | 40 | 0.5 | 216 | 488 | 1375 | 2385 | 795 |
| 120 | 40 | 1.0 | 273 | 648 | 1865 | 2470 | 735 |

From the above results it is evident that the reaction product set forth possesses desirable vulcanization accelerating properties. These properties are increased by operating in the manner as hereinafter set forth.

In all tests hereinafter described, the reaction product of 2,4 dinitrochlorbenzene and the potassium salt of mercapto-benzo-thiazole is designated as accelerator "A".

To show the action of this preferred class of accelerator in conjunction with an organic amine accelerating compound, a rubber stock was compounded in the usual manner comprising 100 parts of pale crepe rubber, 5 parts of zinc oxide, 3.5 parts of sulfur, 0.3 parts of accelerator "A", 0.4 parts of an organic amine accelerating compound as shown in the table below.

On testing strips of the above stock, vulcanized by heating in a press for different periods of time at different temperatures, the following tensile data were obtained.

| Accelerating mixture. | Cure Min. | Pressure lbs. steam | Modulus of elasticity in lbs./in.² at elongations of— | | | Tensile at break | Elongation at break |
|---|---|---|---|---|---|---|---|
| | | | 300% | 500% | 700% | | |
| "A" diphenyl-guanidine | 30 | 10 | 57 | 129 | 239 | 616 | 910 |
| "A" Mono-o-tolyl biguanide | 30 | 10 | | No cure. | | | |
| "A" piperazine | 30 | 10 | | No cure. | | | |

| Accelerating mixture.—Contd. | Cure Min. | Pressure lbs. steam | Modulus of elasticity in lbs./in.² at elongations of— | | | Tensile at break | Elongation at break |
|---|---|---|---|---|---|---|---|
| | | | 300% | 500% | 700% | | |
| "A" diphenetidyl guanidine | 30 | 10 | 125 | 247 | 638 | 1660 | 900 |
| "A" 4, 4' tetra-methyl diamino methylene dianilide | 30 | 10 | 111 | 201 | 535 | 1825 | 940 |
| "A" phenyl-penta-methylene thiourea | 30 | 10 | 55 | 92 | 137 | 458 | 1010 |
| "A" hexa-methylene tetramine | 30 | 10 | | No cure. | | | |
| "A" p-phenylene diamine | 30 | 10 | 82 | 137 | 312 | 601 | 840 |
| "A" diphenyl-guanidine | 60 | 10 | 151 | 362 | 1390 | 2735 | 840 |
| "A" mono-o-tolyl biguanide | 60 | 10 | 69 | 147 | 391 | 1300 | 950 |
| "A" piperazine | 60 | 10 | 111 | 219 | 556 | 1635 | 930 |
| "A" diphenetidyl guanidine | 60 | 10 | 225 | 491 | 1820 | 3350 | 830 |
| "A" 4, 4' tetra-methyl diamino methylene dianilide | 60 | 10 | 231 | 490 | 1670 | 3095 | 820 |
| "A" phenyl penta-methylene thiourea | 60 | 10 | 127 | 247 | 726 | 1735 | 870 |
| "A" hexa-methylene tetramine | 60 | 10 | 62 | 123 | 243 | 651 | 910 |
| "A" p-phenylene diamine | 60 | 10 | 193 | 410 | 1385 | 2640 | 840 |
| "A" diphenyl-guanidine | 30 | 20 | 177 | 356 | 1195 | 2610 | 840 |
| "A" mono-o-tolyl biguanide | 30 | 20 | 77 | 173 | 383 | 1025 | 920 |
| "A" piperazine | 30 | 20 | 112 | 208 | 516 | 1790 | 960 |
| "A" diphenetidyl guanidine | 30 | 20 | 219 | 480 | 1790 | 3295 | 820 |
| "A" 4, 4' tetra methyl diamino methylene dianilide | 30 | 20 | 181 | 455 | 1980 | 3450 | 830 |
| "A" phenyl penta-methylene thiourea | 30 | 20 | 130 | 260 | 778 | 2150 | 903 |
| "A" hexa-methylene tetramine | 30 | 20 | 84 | 164 | 384 | 1155 | 950 |
| "A" p-phenylene diamine | 30 | 20 | 186 | 400 | 1380 | 2745 | 853 |
| "A" diphenyl guanidine | 60 | 20 | 275 | 716 | 2640 | 3370 | 750 |
| "A" mono-o-tolyl biguanide | 60 | 20 | 174 | 371 | 1225 | 2555 | 850 |
| "A" piperazine | 60 | 20 | 208 | 422 | 1410 | 2625 | 830 |
| "A" diphenetidyl guanidine | 60 | 20 | 317 | 776 | 3165 | 4000 | 750 |
| "A" 4, 4' tetra-methyl diamino methylene dianilide | 60 | 20 | 315 | 810 | 3320 | 4010 | 750 |
| "A" phenyl penta-methylene thiourea | 60 | 20 | 212 | 506 | 2020 | 3250 | 820 |
| "A" hexa-methylene tetramine | 60 | 20 | 199 | 444 | 1600 | 2820 | 830 |
| "A" p-phenylene diamine | 60 | 20 | 308 | 715 | 2500 | 3480 | 768 |
| "A" diphenyl guanidine | 15 | 40 | 255 | 597 | 2150 | 3355 | 790 |
| "A" mono-o-tolyl biguanide | 15 | 40 | 130 | 242 | 755 | 1860 | 870 |
| "A" piperazine | 15 | 40 | 167 | 302 | 911 | 2020 | 870 |
| "A" diphenetidyl guanidine | 15 | 40 | 292 | 694 | 2710 | 3580 | 770 |
| "A" 4, 4' tetra-methyl diamino methylene dianilide | 15 | 40 | 260 | 666 | 2675 | 3555 | 750 |
| "A" phenyl penta-methylene thiourea | 15 | 40 | 181 | 369 | 1265 | 2680 | 830 |
| "A" hexa-methylene-tetramine | 15 | 40 | 142 | 290 | 934 | 2195 | 870 |
| "A" p-phenylene diamine | 15 | 40 | 206 | 460 | 1670 | 3210 | 820 |
| "A" diphenyl-guanidine | 30 | 40 | 296 | 809 | 2965 | 3730 | 760 |
| "A" mono-o-tolyl biguanide | 30 | 40 | 185 | 368 | 1250 | 2485 | 840 |
| "A" piperazine | 30 | 40 | 180 | 396 | 1315 | 2680 | 850 |
| "A" diphenetidyl guanidine | 30 | 40 | 362 | 935 | 3680 | 4040 | 730 |
| "A" 4, 4' tetra-methyl diamino methylene dianilide | 30 | 40 | 295 | 761 | 2990 | 3920 | 760 |
| "A" phenyl-penta-methylene thiourea | 30 | 40 | 278 | 585 | 2010 | 3155 | 793 |
| "A" hexa-methylene tetramine | 30 | 40 | 213 | 545 | 2050 | 3195 | 800 |
| "A" p-phenylene diamine | 30 | 40 | 271 | 645 | 2430 | 3250 | 770 |
| "A" diphenyl guanidine | 45 | 40 | 342 | 808 | 3195 | 3525 | 720 |
| "A" mono-o-tolyl biguanide | 45 | 40 | 199 | 436 | 1465 | 2430 | 800 |
| "A" piperazine | 45 | 40 | 171 | 387 | 1325 | 2705 | 830 |
| "A" diphenetidyl guanidine | 45 | 40 | 366 | 995 | 3770 | 4080 | 730 |
| "A" 4, 4' tetra-methyl diamino methylene dianilide | 45 | 40 | 349 | 845 | 3255 | 3900 | 760 |
| "A" phenyl penta-methylene thiourea | 45 | 40 | 276 | 633 | 2255 | 3305 | 770 |
| "A" hexa-methylene tetramine | 45 | 40 | 68 | 668 | 2305 | 3010 | 770 |
| "A" p-phenylene diamine | 45 | 40 | 269 | 652 | 2280 | 3475 | 790 |
| "A" diphenyl guanidine | 60 | 40 | 354 | 870 | 3210 | 3600 | 750 |
| "A" mono-o-tolyl biguanide | 60 | 40 | 244 | 490 | 1625 | 2635 | 800 |
| "A" piperazine | 60 | 40 | 197 | 396 | 1315 | 2740 | 840 |
| "A" diphenetidyl guanidine | 60 | 40 | 406 | 1025 | 4010 | 4090 | 720 |
| "A" 4, 4' tetra methyl diamino methylene dianilide | 60 | 40 | 309 | 790 | 3040 | 3740 | 760 |
| "A" phenyl penta methylene thiourea | 60 | 40 | 237 | 554 | 2120 | 3325 | 793 |
| "A" hexa-methylene tetramine | 60 | 40 | 266 | 667 | 2485 | 3395 | 780 |
| "A" p-phenylene diamine | 60 | 40 | 270 | 636 | 2285 | 3350 | 790 |

The above results very clearly show the desirable accelerating properties of the class of compounds and mixtures thereof as herein disclosed. Thus, when the mixtures of accelerators set forth are employed in a rubber stock cured at lower temperatures, but slight, if any curing action is produced. This fact enables such accelerating mixtures to be employed without producing a set cure, scorching or other undesired results produced by pre-vulcanization of the stock during the milling or calendering of the stock or at any other stage or step carried out in the manufacture of a rubber product prior to the actual vulcanization thereof. On the other hand, the results obtained at full cure show that a vulcanizate is produced which possesses particularly characteristic and desirable properties.

The foregoing examples are to be understood as illustrative only and not at all limitative of the invention. Other vulcanized products may be obtained by employing other compounding ingredients and other proportions of ingredients than those particularly set forth in the examples.

What is claimed is:

1. The process of producing vulcanized rubber which comprises heating rubber and sulfur in the presence of a mixture of accelerators, said accelerators comprising the reaction product of dintrochlorbenzene and an alkaline salt of mercapto-benzo-thiazole, and a basic organic nitrogen-containing vulcanization accelerator.

2. The process of producing vulcanized rubber which comprises heating rubber and sulfur in the presence of a mixture of accelerators, said accelerators comprising the reaction product of dinitrochlorbenzene and the potassium salt of mercapto-benzo-thiazole, and a basic organic nitrogen, containing vulcanization accelerator.

3. The process of producing vulcanized rubber which comprises heating rubber and sulfur in the presence of a mixture of accelerators, said accelerators comprising the reaction product of dinitrochlorbenzene and the potassium salt of mercapto-benzo-thiazole, and a secondary amine accelerating compound.

4. The process of producing vulcanized rubber which comprises heating rubber and sulfur in the presence of a mixture of accelerators, said accelerators comprising the reaction product of dinitrochlorbenzene and the potassium salt of mercapto-benzo-thiazole, and an aryl substituted secondary amine accelerating compound.

5. The process of producing vulcanized rubber which comprises heating rubber and sulfur in the presence of a mixture of accelerators, said accelerators comprising the reaction product of dinitrochlorbenzene and the potassium salt of mercapto-benzo-thiazole, zole, and diphenyl-guanidine.

6. The process of producing vulcanized rubber which comprises heating rubber and sulfur in the presence of a vulcanization accelerating product containing the reaction product of dinitrochlorbenzene and an alkaline salt of mercapto-benzo-thiazole as a constituent thereof.

7. The process of producing vulcanized rubber which comprises heating rubber and sulfur in the presence of a vulcanization accelerating product containing the reaction product of dinitrochlorbenzene and the potassium salt of mercapto-benzo-thiazole as a constituent thereof.

8. The vulcanized rubber product prepared by heating rubber and sulfur in the presence of a mixture of accelerators, said accelerators comprising a reaction product of dinitrochlorbenzene and an alkaline salt of mercapto-benzo-thiazole, and a basic organic nitrogen-containing vulcanization accelerator.

9. The vulcanized rubber product prepared by heating rubber and sulfur in the presence of a mixture of accelerators, said accelerators comprising the reaction product of dinitrochlorbenzene and the potassium salt of mercapto-benzo-thiazole, and a basic organic nitrogen-containing vulcanization accelerator.

10. The vulcanized rubber product prepared by heating rubber and sulfur in the presence of a mixture of accelerators, said accelerators comprising the reaction product of dinitrochlorbenzene and the potassium salt of mercapto-benzo-thiazole and a secondary amine accelerating compound.

11. The vulcanized rubber product prepared by heating rubber and sulfur in the presence of a mixture of accelerators, said accelerators comprising the reaction product of dinitrochlorbenzene and the potassium salt of mercapto-benzo-thiazole, and an aryl substituted secondary amine accelerating compound.

12. The vulcanized rubber product prepared by heating rubber and sulfur in the presence of a mixture of accelerators, said accelerators comprising the reaction product of dinitrochlorbenzene and the potassium salt of mercapto-benzo-thiazole, and diphenyl-guanidine.

13. The vulcanized rubber product prepared by heating rubber and sulfur in the presence of a vulcanization accelerating product containing the reaction product of dinitrochlorbenzene and an alkaline salt of mercapto-benzo-thiazole as a constituent thereof.

14. The vulcanized rubber product prepared by heating rubber and sulfur in the presence of a vulcanization accelerating product cotaining the reaction product of dinitrochlorbenzene and the potassium salt of mercapto-benzo-thiazole as a constituent thereof.

15. A vulcanization accelerator mixture comprising an organic amine and the reaction product of dinitrochlorbenzene and the potassium salt of mercapto-benzo-thiazole.

16. A vulcanization accelerator mixture comprising diphenyl-guanidine and the reaction product of dinitrochlorbenzene and the potassium salt of mercapto-benzo-thiazole.

In testimony whereof I hereunto affix my signature.

WINFIELD SCOTT.

DISCLAIMER 1,732,486.—*Winfield Scott*, Nitro, W. Va. PROCESS FOR THE VULCANIZATION OF RUBBER. Patent dated October 22, 1929. Disclaimer filed January 14, 1932, by the assignee, *The Rubber Service Laboratories Company*.

Does hereby disclaim that part of the claim in said specification which appears therein as claims 2, 3, 6, 7, 9, 10, 13, 14 and 15 thereof, and does hereby disclaim from claims 1, 4, 8 and 11 thereof, any process as to claims 1 and 4 and any product as to claims 8 and 11 excepting a process or a product, respectively, wherein the aryl substituted secondary amine accelerating compound as pointed out in each of said claims 4 and 11, or the basic organic nitrogen-containing vulcanization accelerator as pointed out in each of said claims 1 and 8, contains in its molecular structure a carbon atom of a benzene nucleus directly attached to a nitrogen atom of an amino group and another group of atoms attached to this notrogen atom.

Your petitioner further says that the subject matter not herein and hereby disclaimed is definitely distinguishable from the part or parts disclaimed herein and is truly and justly the invention of said Winfield Scott, and is a material and substantial part of the thing patented.

[*Official Gazette February 9, 1932.*]